(12) United States Patent
Arnulf et al.

(10) Patent No.: US 11,660,667 B2
(45) Date of Patent: *May 30, 2023

(54) SYSTEM FOR TRACKING AND ASSESSING THE CONDITION OF REFRACTORY ELEMENTS IN A METALLURGIC FACILITY

(71) Applicant: VESUVIUS GROUP, S.A., Ghlin (BE)

(72) Inventors: Patrick Arnulf, Meyrie (FR); Antonio Favia, Chassieu (FR); Denis Juan, Meyzieu (FR); Eric Martin, Saint Martin de Crau (FR); Jan Mennerich, Münsingen (CH); Corentin Picard, Lyons (FR)

(73) Assignee: Vesuvius Group, S.A., Ghlin (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/618,908

(22) PCT Filed: Jun. 8, 2020

(86) PCT No.: PCT/EP2020/065829
§ 371 (c)(1),
(2) Date: Dec. 14, 2021

(87) PCT Pub. No.: WO2020/254134
PCT Pub. Date: Dec. 24, 2020

(65) Prior Publication Data
US 2022/0258228 A1  Aug. 18, 2022

(30) Foreign Application Priority Data

Jun. 18, 2019 (EP) .................................. 19181066
Jun. 18, 2019 (EP) .................................. 19181068

(51) Int. Cl.
*B22D 41/32* (2006.01)
*B22D 41/12* (2006.01)
(Continued)

(52) U.S. Cl.
CPC ............. *B22D 41/32* (2013.01); *B22D 41/12* (2013.01); *B22D 41/28* (2013.01); *B22D 41/38* (2013.01);
(Continued)

(58) Field of Classification Search
CPC ........ B22D 41/32; B22D 41/12; B22D 41/38; B22D 41/42
See application file for complete search history.

(56) References Cited

U.S. PATENT DOCUMENTS

| 506,328 A | 10/1883 | Morris |
| 311,902 A | 2/1885 | Lewis |
| 7,171,326 B2 * | 1/2007 | Gerber ................... B22D 41/28 266/236 |

FOREIGN PATENT DOCUMENTS

| CN | 202815877 U | 3/2013 |
| FR | 2395095 A1 | 1/1979 |

(Continued)

OTHER PUBLICATIONS

Fachbacher R, Binder A, Erlacher A, Saw-Rfid and Temperature Monitoring of Slide Gate Plates, IEEE Sensors 2009 : the 8th annual IEEE Conference on Sensors ; Christchurch, New Zealand, Oct. 25-28, 2009, Jan. 1, 2009 IEEE.

*Primary Examiner* — Scott R Kastler
(74) *Attorney, Agent, or Firm* — MaxGoLaw PLLC

(57) ABSTRACT

System for tracking and assessing the condition of replaceable refractory elements in a metallurgic facility comprising: a) a plurality of identifiable metallurgical vessels, such as ladles, wherein each one of said identifiable metallurgical vessels comprises removable refractory elements, such as slide gate valve plates; b) a plurality of replacement refractory elements, wherein each replacement refractory element comprises a machine-readable identification tag comprising refractory element identification data; c) a reading station, (Continued)

such as an RFID workbench, for reading the machine-readable identification tags of a replacement refractory element positioned in a reading zone of the reading station; d) a refractory condition tool for assessing the condition of refractory elements coupled to anyone of said metallurgical vessels; e) a monitoring unit connectable to the reading station and the refractory condition tool.

16 Claims, 7 Drawing Sheets

(51) Int. Cl.
*B22D 41/38* (2006.01)
*B22D 41/42* (2006.01)
*G01M 13/003* (2019.01)
*B22D 41/28* (2006.01)
*B22D 46/00* (2006.01)

(52) U.S. Cl.
CPC .............. *B22D 41/42* (2013.01); *B22D 46/00* (2013.01); *G01M 13/003* (2019.01)

(56) References Cited

FOREIGN PATENT DOCUMENTS

| | | |
|---|---|---|
| JP | 2008221271 A | 9/2008 |
| WO | 2003080274 A1 | 10/2003 |
| WO | 2005007325 A1 | 1/2005 |
| WO | 2010057656 A1 | 5/2010 |
| WO | 2020254134 A1 | 12/2020 |

* cited by examiner

SYSTEM FOR TRACKING AND ASSESSING THE CONDITION OF REFRACTORY ELEMENTS IN A METALLURGIC FACILITY

CROSS-REFERENCE TO RELATED APPLICATIONS

This application is the National Stage application of International Application No. PCT/EP2020/065829, filed Jun. 8, 2020, which claims the benefit of European Provisional Patent Application No. EP 19181066.2, filed Jun. 18, 2019, and of European Provisional Patent Application No. EP 19181068.8, filed Jun. 18, 2019, the contents of each of which are incorporated by reference into this specification.

FIELD OF THE INVENTION

The present invention relates to a system for tracking and assessing the condition of replaceable refractory elements, such as sliding gate valve plates, in a metallurgic facility comprising metallurgic vessels, such as ladles.

DESCRIPTION OF PRIOR ART

In a metallurgic facility, numerous refractory elements are operated under severe conditions and wear off with time, so that they must be replaced frequently. An example of such refractory elements to be replaced frequently are sliding gate valve plates.

Sliding gate valves are well known in the art. Sliding gate valves are used to control the flow of molten metal poured from an upstream metallurgic vessel to a downstream vessel. For example, from a furnace to a ladle, from a ladle to a tundish or from a tundish into an ingot mould. For example, US-A-0311902 or US-A-0506328 disclose sliding gate valves arranged at the bottom of a casting ladle wherein pairs of refractory sliding gate valve plates provided with a through bore are slid one with respect to the other. When the pouring orifices are in register or partially overlap, molten metal can flow through the sliding gate valve (the "casting channel" is open) while when there is no overlap between the pouring orifices, the molten metal flow is totally stopped (the "casting channel" is closed). Partial overlap of the pouring orifices allows the regulation of the molten metal flow by throttling the molten metal stream. Although sliding gate valves have evolved considerably in the last decades, the principle remains the same, with one plate sliding relative to another to control the level of overlap between the through bores of the two plates.

JP2008221271 discloses an apparatus for assessing the wear state of sliding gate valve plates in a metallurgic vessel. Such apparatus allows to check for signs of excessive wear in the sliding gate valve plates and consequently provides an indication to the operators regarding whether a sliding gate valve has to be refurbished by replacing its sliding gate valve plates. The apparatus from this prior art does however not allow to keep track of the sliding gate valve plates once they have been placed in the metallurgical vessels. Although such sliding gate valve plates can have a tag with an identification number, such tag will be destroyed or become hardly readable as soon as molten metal is poured in the metallurgic vessel. This apparatus from the prior art will consequently allow to take punctual decisions regarding whether a set of sliding gate valve plates has to be replaced, but it will not allow to collect and store historic wear data for every sliding gate valve plate, and to relate such historic data for example to the manufacturing features of the sliding gate valve plate, typically associated with the lot number or to an identification number of the sliding valve plate. In order to increase the understanding of the impact of the production processes of the refractory elements on their properties in use, it would be desirable to have a system allowing to link the historic condition data of refractory element to its manufacturing features and to metal production parameters, related to the use of the refractory elements in the metal casting process.

Document WO 2005/007325 discloses different methods for objectively determining whether a refractory plate of a slide gate valve can be reused or should be disposed of, for example by comparing a theoretical and actual throttling rate of the orifices of the slide gate valve. The methods described are however difficult to implement because they require the measurement of several parameters during metal casting, such as the instant flow rate of the molten metal through the slide gate valve, in order to deduce the actual throttling rate of the orifices of the slide gate valve. They also require the computation of a theoretical instant flow rate of the molten metal from the laws of physics, and an accurate physical model of the mechanical interactions between the metallurgical vessel, slide gate valve and molten metal is therefore necessary. The methods described in this prior art document are therefore at the same time difficult to implement and have a limited accuracy, due to imperfections in the physical measurements during metal casting and approximations in the model used to compute the theoretical molten metal flow rate through the slide gate valve. Furthermore, no method or system is disclosed for automating the collection of the condition data for the different sets of plates and for the storage in a computer memory of said condition data.

Document WO 2010/057656 discloses a monitoring system and method for actively tracking specific data on systems or the components of a metallurgical system. The method uses RFID tags fixed to the individual components or systems of the metallurgical facility and is therefore not applicable to refractory elements such as slide gate valve plates, which are exposed to the thermal, mechanical and chemical stress caused by the molten metal. RFID tags placed on slide gate valve plates do indeed not resist to the metal casting operations and can therefore not be operated to track slide gate valve plates in use. Furthermore, this document does not disclose any system or method to actually assess the condition of refractory elements such as slide gate valve plates.

SUMMARY OF THE INVENTION

It is an object of the present invention to provide a system for tracking and assessing the condition of replaceable refractory elements in metallurgic facility, such to have insights about the historic wear data of the refractory elements in association with both the manufacturing features of said refractory elements and metal production parameters, related to the use of the refractory elements in the metal casting process.

The present invention is defined in the appended independent claims. Preferred embodiments are defined in the dependent claims. In particular, the invention concerns a system for tracking and assessing the condition of replaceable refractory elements in a metallurgic facility comprising:

a) a plurality of identifiable metallurgical vessels, such as ladles, wherein each one of said identifiable metallurgical vessels comprises removable refractory elements, such as slide gate valve plates;

b) a plurality of replacement refractory elements, wherein each replacement refractory element comprises a machine-readable identification tag comprising refractory element identification data;

c) a reading station, such as an RFID workbench, for reading the machine-readable identification tags of a replacement refractory element positioned in a reading zone of the reading station;

d) a refractory condition tool for assessing the condition of refractory elements coupled to anyone of said metallurgical vessels;

e) a monitoring unit connectable to the reading station and the refractory condition tool, wherein the monitoring unit is configured to:

i. receive from the refractory condition tool condition data of at least one refractory element coupled to one of said metallurgical vessels;

ii. receive identification data of said metallurgical vessel;

iii. store in a refractory condition database said condition data in association with identification data of said metallurgical vessel;

iv. decide whether the refractory element must be replaced based on said condition data ("GO OR NO GO"), and in case the case the refractory element must be replaced ("NO GO"), the monitoring unit is configured to:

a. ascertain that refractory element identification data received from the reading station corresponds to the identification data of the replacement refractory element replacing said at least one refractory element;

b. associate in the refractory condition database said refractory element identification data with the identification data of said metallurgical vessel (1).

In an advantageous embodiment, the monitoring unit comprises a human-machine interface or HMI, wherein, said HMI is configured to inform a human operator whether the refractory element must be replaced or not.

In an advantageous embodiment, when a refractory element must be replaced, the HMI is configured to request that a human operator acknowledges that refractory element identification data received by the reading station corresponds to the identification data of the replacement refractory element replacing said at least one refractory element.

In an advantageous embodiment, each metallurgical vessel comprises a machine-readable tag and the monitoring unit is configured to read such machine-readable tag when the metallurgical vessel is in a detection zone of the monitoring unit.

In an advantageous embodiment, i. the monitoring unit is configured to associate by default in the refractory condition database the refractory element identification data of the replacement refractory element placed in the reading zone of the reading station with the identification data of the metallurgical vessel located in the detection zone of the monitoring unit;

ii. the HMI is configured such that the human operator can modify the default association.

In an advantageous embodiment, the monitoring unit operates a robotic system configured to perform one or more of the following manipulations: manipulating the replacement refractory elements, placing a replacement refractory element in the reading zone of the reading station, removing a spent refractory element from the metallurgical vessel, coupling a replacement refractory element to the metallurgical vessel, coupling and uncoupling the refractory condition tool to the metallurgical vessel.

In an advantageous embodiment, the reading station is an RFID workbench and replacement refractory elements comprise RFID tags.

In an advantageous embodiment, the identification data of the metallurgical vessels are included on 2D barcodes placed on the ladle gates, said monitoring unit being configured to read such 2D barcodes.

In an advantageous embodiment, the monitoring unit is configured to store, in said refractory condition database, refractory manufacturing data in association with said refractory identification data, said refractory manufacturing data comprising at least one of the following data:

Refractory material;

Refractory manufacturing process parameters, such as the temperature, pressure and duration of various manufacturing steps;

Refractory manufacturing date.

In an advantageous embodiment, the monitoring unit is configured to store, in said refractory condition database, metal process data in association with the identification data of said metallurgical vessel, said metal production data comprising at least one of the following data:

Type of the metal cast in said metallurgical vessel and metal grade;

Type of the different refractories used in the metallurgical vessel;

Frequency and/or duration of down time(s) of the metallurgical vessel;

End product features of the metal production process;

Casting times;

Casting temperatures;

Heat chemistry;

Install date/time of new refractory element(s);

Number of casts with the same refractory element(s).

In an advantageous embodiment, the system according to the invention comprises a computing unit, said computing unit being configured to compute the coefficients of a machine learning predictive model for the refractory condition data, wherein said computing unit is configured to i. generate a plurality of training instances based on the data of said refractory condition database, wherein each training instance comprises:

1. a training instance input based on at least one parameter extracted from the refractory manufacturing data and/or on at least one parameter extracted from the metal production data;

2. a training instance output based at least one parameter extracted from the refractory condition data;

ii. train the machine learning predictive model based on the training instances.

In an advantageous embodiment, the refractory condition tool is a plate condition tool for the measurement of condition data of slide gate valve plates coupled to the slide gate valve of a metallurgic vessel, such as a ladle, said slide gate valve comprising a collector nozzle protruding from an outer wall of said slide gate valve, said slide gate valve being able to switch between an open and a closed configuration by sliding at least two slide gate valve plates with respect to one another, said collector nozzle being in fluid communication with a casting channel of said metallurgic vessel when said slide gate valve is in the open configuration, said plate condition tool comprising:

a main body comprising an obturator for obturating at least partially the collector nozzle;

a gas injecting device comprising a pressure regulator for injecting a gas in the collector nozzle through the obturator at a target pressure;

a gas flow measuring device for measuring the flow of the gas injected by the gas injecting device;

a controller being communicatively connected to the gas flow measuring device and being configured to receive input data relating to the relative position of the slide gate valve plates.

In an advantageous embodiment, the controller is configured to store in a memory of said controller the gas flow (GF) necessary to reach the target pressure and the relative position (RP) of the slide gate valve plates as functions of the time variable.

In an advantageous embodiment, the controller is configured to process the gas flow (GF) function such to extract a first indicator by computing the derivative of said function and a second indicator by computing the integral of said function.

BRIEF DESCRIPTION OF THE DRAWINGS

These and further aspects of the invention will be explained in greater detail by way of example and with reference to the accompanying drawings in which.

DETAILED DESCRIPTION OF PREFERRED EMBODIMENTS

Figure 1A:
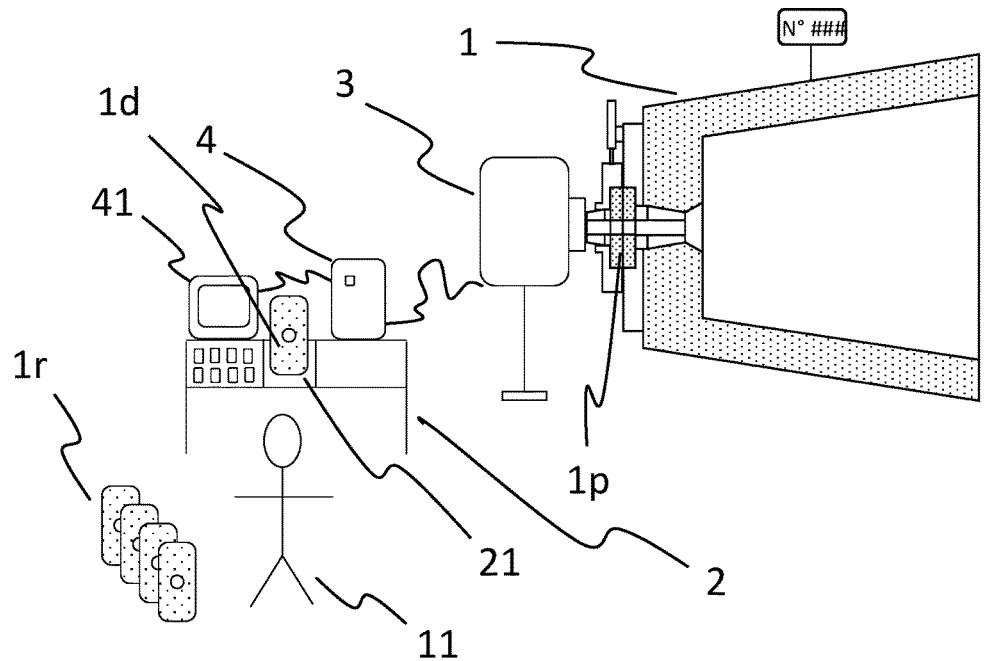
FIGS. 1a) & 1b) show respectively a first and a second embodiment of the system according to the invention.

FIG. 1(a) represents a first embodiment of a system according to the present invention. A ladle 1 lies on its side in a workshop where it is checked for worn elements and for refurbishing.

According to one essential feature of the present invention, the ladle 1 belongs to a collection of metallurgical vessels wherein each metallurgical is identifiable, which means that every metallurgical vessel of the collection can be distinguished from the others. In the embodiment illustrated in FIG. 1(a), the ladle 1 bears a unique identification number No ### on its outer wall, such that it can be identified, for example by a human operator 11. Alternatively, the metallurgical can bear a RFID tag or a barcode, such as a QR code.

According to another essential feature of the present invention, the ladle 1 comprises removable refractory elements, such as slide gate valve plates 1p. Sliding gate valve plates 1p need to be replaced within short intervals of time, due to the mechanical and thermal constraints under which they are operated. Sliding gate valve plates 1p are therefore advantageously mounted on the slide gate valve of the ladle 1 thanks to a reversible mechanical coupling. A slide gate valve plate 1p can for example be clamped in a cradle of the slide gate valve, such that it can be changed by a human or robotic operator from time to time. Other refractory elements of the slide gate, such as the collector nozzle or inner nozzle, can also be replaced when required.

In FIG. 1(a), a human operator 11 is standing next to a pile of replacement refractory elements 1r. Each replacement refractory element 1r bears a machine-readable tag (not represented), such as a RFID tag or a barcode. The human operator 11 interacts with a reading station 2 configured to read the machine-readable identification tag of a replacement refractory element 1d positioned in the reading zone 21 of the reading station 2. The system according to the present invention also comprises a refractory condition tool 3 for assessing the condition of refractory elements, such as the slide gate valve plates 1p, of the metallurgical vessel 1. The refractory condition tool 3 is advantageously configured to measure physical parameters from which the wear condition of the refractory element 1p can be deduced. In particular, the refractory condition tool 3 must be able to detect when the refractory element is in a state of excessive wear, to such an extent that it must be replaced. Document JP2008221271 discloses for example such a refractory condition tool 3 for assessing the wear condition of slide gate valve plates of a metallurgical vessel. Further examples of refractory condition tools will be introduced further in this text.

Figure 1B:
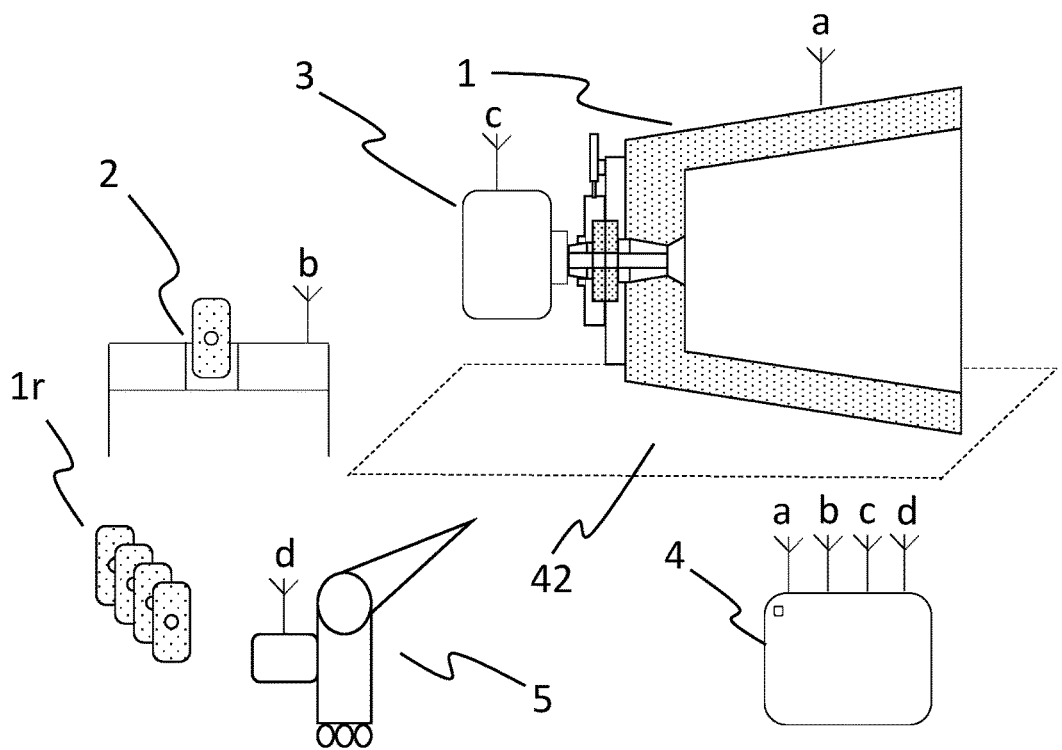

According to another essential feature of the invention, the system comprises a monitoring unit 4. The monitoring unit 4 is connectable to the reading station 2 and to the refractory condition tool 3. The monitoring unit 4 is configured to receive, from the refractory condition tool 3, condition data of at least one refractory element coupled to the metallurgical vessel 1. After they have been received, the condition data are stored by the monitoring unit 4 in a refractory condition database in association with identification data of the metallurgical vessel 1. The monitoring unit 4 is also configured to establish whether the refractory element 1p must be replaced or not based on said condition data and to issue a "GO" or "NO GO" decision accordingly. The monitoring unit 4 comprises at least one processor and preferably a memory. Such processor can be located in the workshop of the metallurgical facility, in direct proximity with the other components of the system according to the invention, such as the reading station 2 and the refractory condition tool 3. The refractory condition tool 3 is then advantageously communicatively connected to the monitoring unit 4 using a wired connection, as represented in FIG. 1a), or using a wireless connection, as represented in FIG. 1b) (antenna "c").

Alternatively, the monitoring unit 4 can be located remotely and can communicate, by a wired or wireless connection, with the other components of the system according to the invention through a computer network thanks to a communication protocol such as TCP/IP. It can also comprise a plurality of processors wherein at least some of these processors are embedded in other components of the system, such as the reading station 2 or the refractory condition tool 3. The refractory condition database can be stored in a memory of the monitoring unit 4. Alternatively, the refractory condition database can be a central database hosted on a remote server and gathering the refractory condition data from different metallurgical facilities.

In the embodiment of FIG. 1(a), the refractory condition tool 3 and the replacement refractory elements 1r are manipulated b a human operator 11. In this embodiment, the human operator 11 is responsible for placing a replacement refractory element 1r in the reading zone 21 of the reading station 2. The extraction of a spent refractory element 1p from the metallurgical vessel 1 and the coupling of a replacement refractory element in the metallurgical vessel 1 in case of a "NO GO" decision from the monitoring unit 4 is also performed manually by the human operator 11. In this embodiment, the monitoring unit 4 comprises therefore advantageously a human machine interface 41 (HMI) for managing interactions between the system according to the present invention and the human operator 11. The HMI 41 is then advantageously configured to inform the human operator 11 whether the refractory element 1p must be replaced or not, by displaying for example a message on a screen. The HMI 41 is advantageously communicatively connected to the monitoring unit 4 in a wired connection as represented in FIG. 1a). Alternatively, the HMI 41 can be in a wireless connection with the monitoring unit 4. In still another embodiment, the HMI 41 can be integrated to the monitoring unit 4 such that they share at least one common electronic processor.

As explained supra, the identification data of the metallurgical vessel 1 are data associated with the metallurgical vessel 1 that allow to distinguish such metallurgical vessel 1 from the other metallurgical vessels in the metal casting facility. As represented in FIG. 1a), they can correspond to a unique identification number No ### on the outer wall of the metallurgical vessel 1. In this embodiment, the HMI 41 can be configured to receive, from the operator 11, the identification number No ### of the metallurgical vessel 1 currently in the workshop. Alternatively, the metallurgical vessel 1 can bear a machine-readable tag, such as a RFID tag, as illustrated in FIG. 1b) (antenna "a"). In this embodiment, the monitoring unit 4 is configured to read the RFID tag of the metallurgical vessel 1 in order to obtain its identification data, when the metallurgical vessel 1 is located in a detection zone 42 of the monitoring unit 4. It is important to note that, throughout this text, the unique identification number or machine-readable tag can be located on a removable part from the metallurgical vessel 1, such as the slide gate valve 1v, provided such removable part has a lifetime, on the metallurgical vessel 1, having at least an order of magnitude larger than the one of the lifetime of the refractory element 1p. An identification number of such a removable part can then be considered as the metallurgical vessel identification data when implementing the system according to the invention.

If the monitoring unit 4 establishes that the refractory element 1p must be replaced or in other words that it has issued a "NO GO" decision, the monitoring unit 4 will then ascertain that refractory element identification data received from the reading station 2 correspond to the identification data of the replacement refractory element replacing the at least one refractory element 1p. The monitoring unit 4 is then configured to associate in the refractory condition database such refractory element identification data with the identification data of the metallurgical vessel 1.

The present invention also relates to the method implemented by the at least one processor of the monitoring unit 4, wherein the method comprises the step of:
  i. receiving from a refractory condition tool 3 condition data of a refractory element 1p coupled to an identifiable metallurgical vessel 1;
  ii. receiving identification data of the metallurgical vessel 1;
  iii. storing in a refractory condition database said condition data in association with identification data of said metallurgical vessel 1;
  iv. deciding whether the refractory element 1p must be replaced based on said condition data ("GO OR NO GO"), and in case the case the refractory element 1p must be replaced ("NO GO"), the monitoring unit 4 is configured to implement the steps of:
   a. ascertaining that refractory element identification data received from a reading station 2 correspond to the identification data of the replacement refractory element replacing said at least one refractory element 1p;
   b. associating in the refractory condition database said refractory element identification data with the identification data of said metallurgical vessel 1.

The method described above is advantageously performed for a plurality of identifiable metallurgical vessels 1 and repeated at regular timesteps.

When a human operator is responsible for manipulating the replacement refractory elements 1r and coupling them to the various metallurgical vessels, the ascertainment that refractory element identification data received from the reading station 2 correspond to the identification data of the replacement refractory element replacing the refractory element 1p will request an input from the human operator 11.

The HMI 41 is advantageously configured to request that, when a refractory element 1p must be replaced, the human operator 11 acknowledges that refractory element identification data received by the reading station 2 correspond to the identification data of the replacement refractory element replacing the spent refractory element 1p. In one embodiment, the HMI 41 can be configured to request that, when the refractory element 1p must be replaced, the human operator 11 acknowledges that the replacement refractory element 1d currently placed in the reading zone 21 of the reading station 2 corresponds to the refractory element that he is about to couple to the metallurgical vessel 1, in replacement of the spent refractory element 1p. The human operator 11 can for example be requested to press a button on a keyboard confirming that the refractory element identification data just received by the reading station 2 from the replacement refractory element 1d in the reading zone 21 correspond to the identification data of the refractory element which is to be coupled to the metallurgical vessel 1 by the human operator.

In another embodiment, when the metallurgical vessels bear RFID tags and the monitoring unit 4 is configured to extract the metallurgical vessel identification data from such RFID tags, the monitoring unit 4 can be configured to associate by default in the refractory condition database the refractory element identification data of the replacement refractory element 1d placed in the reading zone 21 of the reading station 2 with the identification data of the metallurgical vessel 1 located in the RFID detection zone 42 of the monitoring unit 4. In this configuration, the human operator 11 will be trained to place a replacement refractory element 1d only after a "NO GO" decision has been issued by the monitoring unit 4 for the metallurgical vessel 1. In this embodiment, the placing of a replacement refractory element 1d in the reading zone 21 of the reading station 2 is indeed considered by the monitoring unit 4 as an acknowledgement by the operator that the refractory element 1d is replacing the refractory element 1p in the metallurgical vessel 1. The HMI 41 is however advantageously configured such that the human operator 11 can modify the default association. This will allow the human operator 11 to rectify the default association in case he placed inadvertently a replacement refractory 1d in the reading zone 21 while the monitoring unit 4 finally issues a "GO" decision for the metallurgical vessel 1 currently in the workshop.

FIG. 1b) shows an embodiment of the invention wherein the system is configured to work in an automated configuration, with a limited human intervention or even without any human operator 11. In this case, the monitoring unit 4 can operate a robotic system 5. Such robotic system 5 is advantageously configured to perform one or more of the manipulations the operator 11 has to manage in the embodiment of FIG. 1a), including: manipulating the replacement refractory elements 1r, placing a replacement refractory element 1r in the reading zone 21 of the reading station 2, removing a spent refractory element 1p from the metallurgical vessel 1, coupling a replacement refractory element 1r to the metallurgical vessel 1, coupling and uncoupling the refractory condition tool 3 to the metallurgical vessel 1.

Figure 2A:
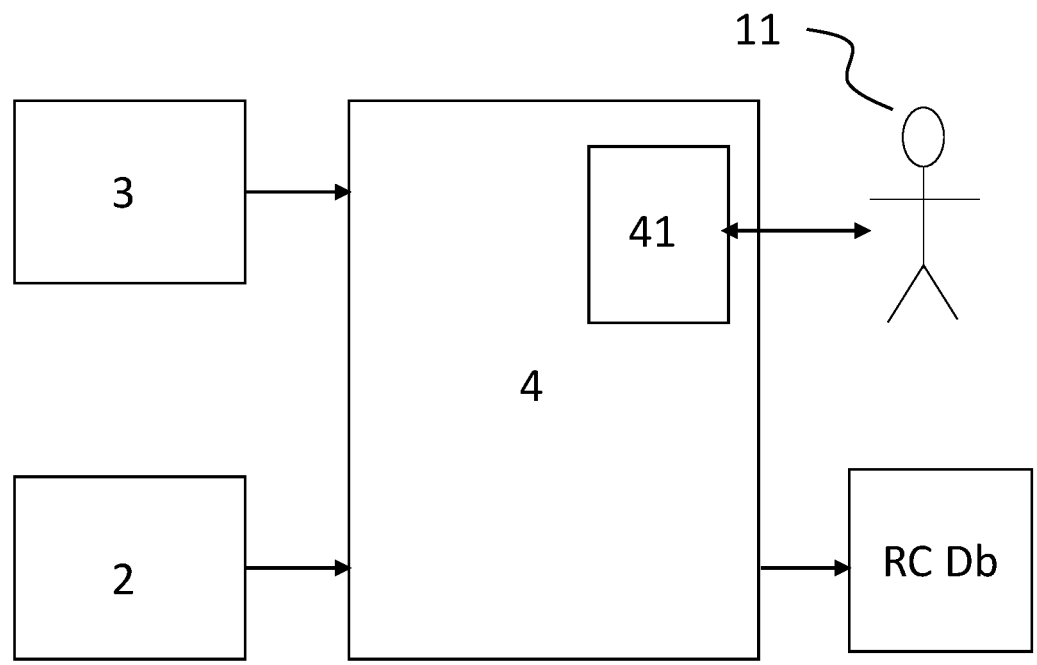
FIGS. 2a) & 2b) represent the interactions between the monitoring unit and the other components in the embodiments of FIGS. 1a) & 1b)

FIGS. 2a) & 2b) summarize the interactions between the monitoring unit 4 and the other components in the embodiments of FIGS. 1a) & 1b). In these figures, "RC Db" stands for "refractory condition database". As illustrated in FIGS. 1b) & 2b), in the case of a fully automated configuration of the system according to the invention, the different metallurgical vessels advantageously bear a machine-readable tag (antenna "a"), such that the identification data of a metallurgical vessel 1, contained in the machine-readable tag, can be read by the monitoring unit 4 when the metallurgical vessel 1 is a static detection zone 42. Alternatively, the robotic system 5 can be configured to read the machine-readable tag of the metallurgical vessel 1 thanks to an appropriate reading system integrated to the robotic system 5, such as a machine vision system or an RFID reading station.

Figure 3:
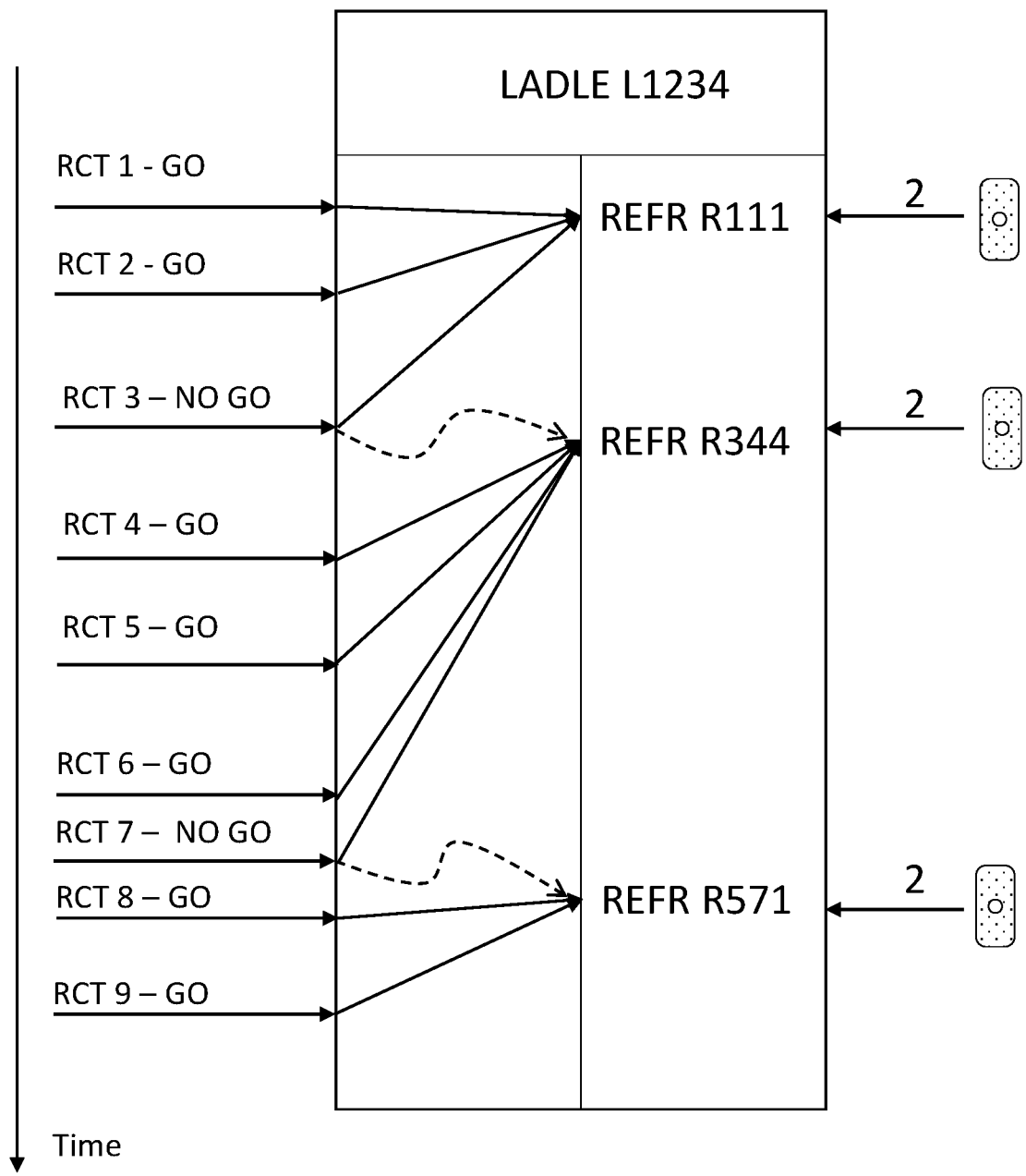
FIG. 3 shows an example illustrating how the refractory condition database can be updated by the monitoring unit.

FIG. 3 shows an example illustrating how the refractory condition database can be updated by the monitoring unit 4 for a ladle whose identification data are L1234. Successive refractory condition tests RCT1-9 at different moments by the refractory condition tool 3 produce refractory condition data and either a "GO" or "NO GO" decision from the monitoring unit 4. Initially, the refractory element with identification data R111 is coupled to the ladle L1234. As represented, the two first refractory condition tests RCT1, RCT2 result in a "GO" decision because they reflect that the refractory element R111 does not show signs of excessive wear. On the other hand, the third refractory test RCT 3 results in a "NO GO" decision. This "NO GO" decision triggers the replacement of refractory element R111 by a replacement refractory element R344, whose identification are obtained by the monitoring unit 4 from the reading station 2. The monitoring unit 4 then associate the subsequent refractory condition tests RCT 4-7 to this new refractory element R344, up to the refractory condition test RCT 7 at which it is established that refractory element R344 must be replaced because a "NO GO" decision is issued. The same updating process can be applied by the monitoring unit 4 for the different metallurgical vessels 1 of a metallurgical facility. The refractory condition database can also gather the refractory condition data from different metallurgical facilities comprising each a system according to the present invention.

The refractory condition database, updated by at least one monitoring unit 4, allows consequently tracking the refractory elements in use in one or several metallurgical facilities and linking every one of them to their condition data, measured at successive timesteps. With the system according to the present invention, such a valuable database can be built despite the lack of access to identification tags born by the refractory elements, or even their destruction, once they have been operated in the metallurgical vessel.

While this refractory condition database will allow to track individually the various refractory elements in a metallurgical facility and can be integrated for example in supply chain management applications for metal casting facilities, it can also be used for generating a computational model of the behavior of the refractory elements 1p, 1r in the metallurgical facility. To this end, refractory manufacturing data, such as the refractory material or some refractory production process parameters, such as the temperature, pressure and duration of various refractory manufacturing steps, can be stored in the refractory condition database, advantageously by the monitoring unit 4, in association with the identification data of the corresponding refractory element. Such refractory manufacturing data can for example be extracted from a refractory manufacturing database thanks to the refractory identification data and/or batch number and/or production time associated with the refractory element.

Metal production data can also be stored, advantageously by the monitoring unit 4, in the refractory condition database. Such metal production data can be associated with the identification data of a corresponding metallurgical vessel 1 and advantageously comprises at least one of the following data: type of the metal cast in the metallurgical vessel 1, type of the different refractories used in the metallurgical vessel 1, frequency and/or duration of down times of the metallurgical vessel, end product features of the metal production process. When the refractory elements 1p to be monitored are slide gate valve plates, the metal production data also advantageously include the time of use of the plates in wearing condition. To this end, the time of full closing and the time of full opening of the slide gates valve plates can be deduced from the total casting time, since, in these two positions, the plates are subject to little or no wear. Alternatively, data relating to the number of relative moves performed by the slide gate valve plates of the metallurgical vessel 1 can also be stored can be associated with the identification data of the corresponding metallurgical vessel 1.

In an advantageous embodiment, the system according to the present invention comprises a computing unit configured to train a machine learning predictive model for the refractory condition data, such as a (deep) neural network model or a probabilistic graphical model, wherein said computing unit is configured to
  i. generate a plurality of training instances based on the data of said refractory condition database, wherein each training instance comprises:
    a training instance input based on at least one parameter extracted from the refractory manufacturing data and/or on at least one parameter extracted from the metal production data;
    a training instance output based at least one parameter extracted from the refractory condition data;
  ii. train the machine learning predictive model based on the training instances.

Figure 2B:
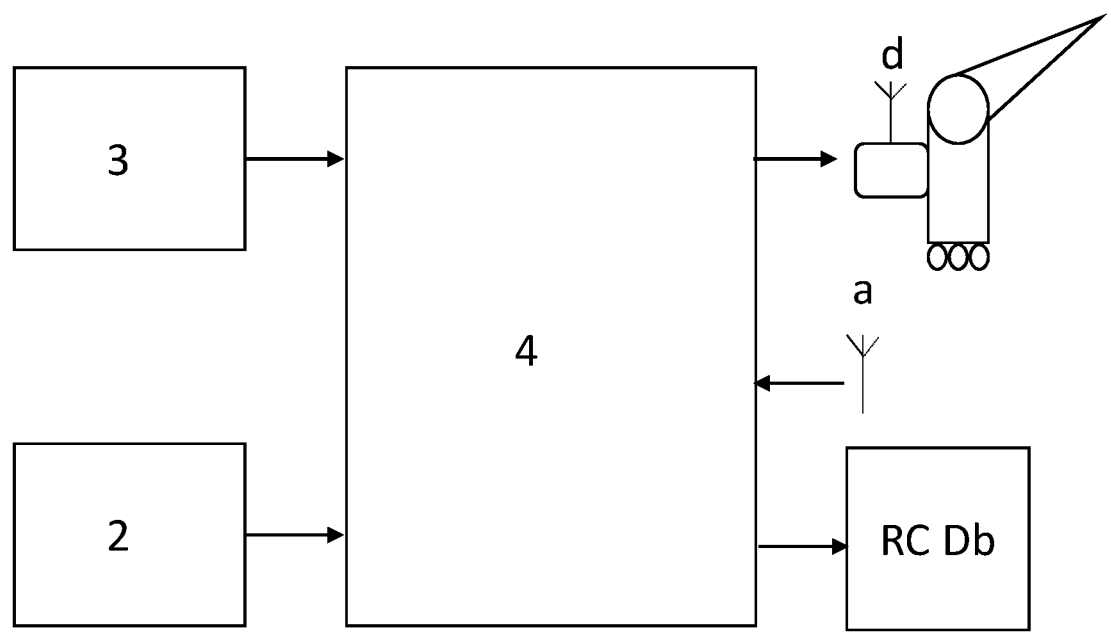
Figure 4A:
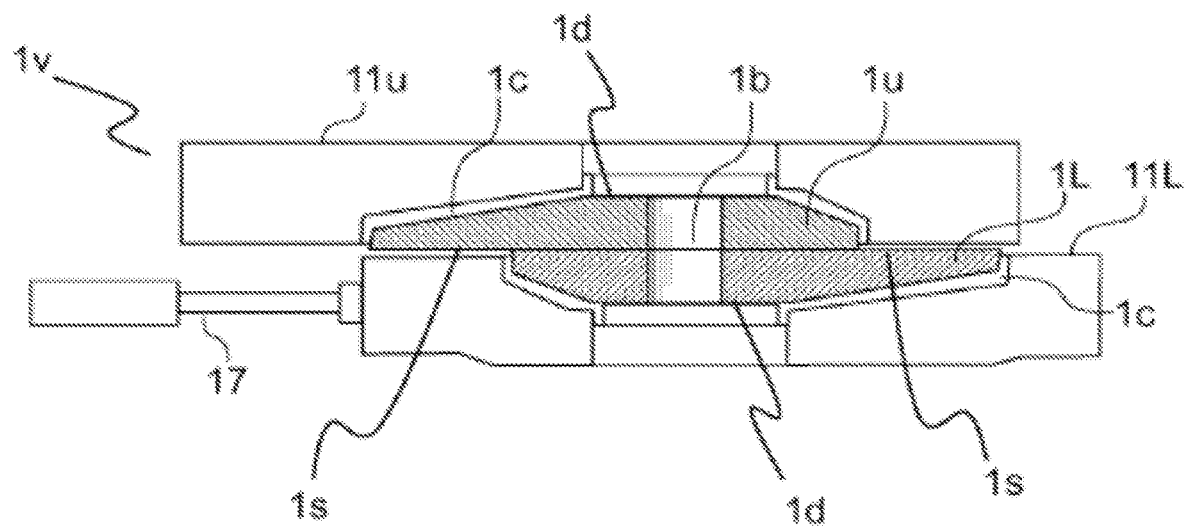
FIG. 4 shows (a) a two-plate and (b) a three-plate sliding gate valve of a metallurgical vessel.
Figure 4B:
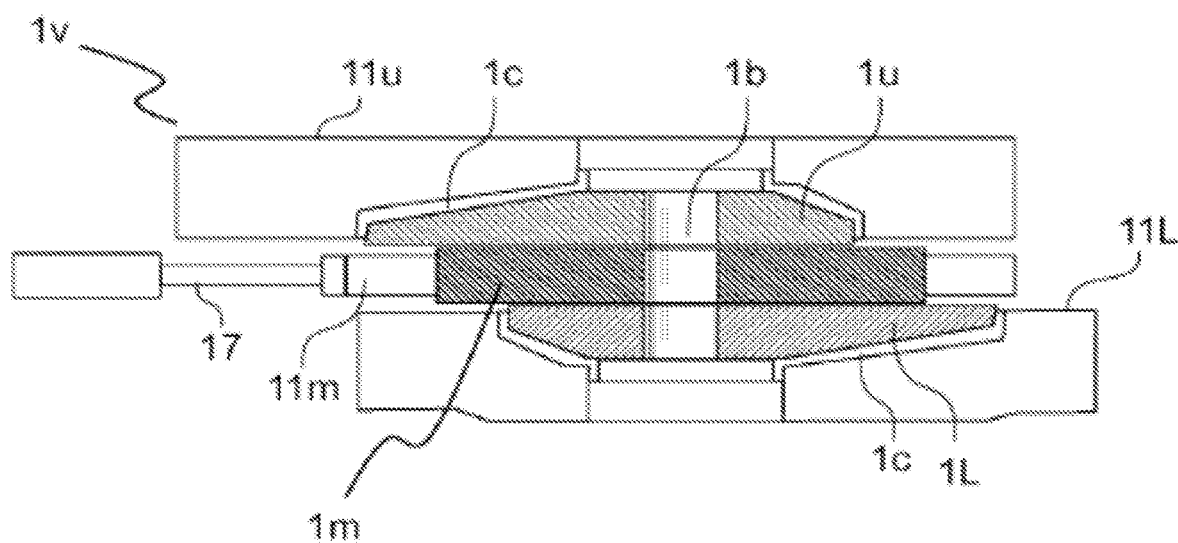

As already explained supra, the refractory elements 1r, 1p can be slide gate valve plates. Such slide gate valve plates 1r, 1p are essential parts in the sliding gate valve 1v of a metallurgical vessel. The sliding gate valve can be a two-plate or a three-plate sliding gate valve. As illustrated in FIG. 4a) a two-plate sliding gate valve comprises a top sliding gate valve plate 1u and a bottom sliding gate valve plate 1L, whilst a three-plate sliding gate as illustrated in FIG. 2(b) further comprises a mid-sliding gate valve plate 1m sandwiched between a top and a bottom sliding gate valve plate 1u, 1L.

A sliding gate valve plate comprises a sliding surface is separated from a second surface 1d by a thickness of the sliding gate valve plate and joined to one another by a peripheral edge. It also comprises a through bore 1b extending normal to the sliding surface. The second surface 1d of a mid-sliding gate valve plate 1m is also a sliding surface. The top, bottom, and optionally the mid-sliding gate valve plates are each coupled to a receiving cradle 1c of a corresponding top, bottom, and optionally mid-plate support frame 11t, 11L, 11m, with at least one sliding surface is of one plate in sliding contact with a sliding surface is of a second plate.

The top plate support frame 11u is fixed relative to the metallurgic vessel, and the top sliding gate valve plate 1u is generally coupled to an inner nozzle of the metallurgic vessel. In a two-plate sliding gate valve (cf. FIG. 4(a)) the bottom plate support frame 11L is a movable carriage which can translate driven by a pneumatic or hydraulic piston 17 such that the sliding surface of the bottom sliding gate valve plate slides in contact against and relative to the sliding surface of the top sliding gate valve plate. In a three-plate sliding gate valve, the bottom plate support frame 11L is fixed relative to the top plate support frame and to the metallurgic vessel. The mid-plate support frame 11m is a movable carriage suitable for sliding the two sliding surfaces of the mid-sliding gate valve plate against and relative to the sliding surfaces of the top and bottom sliding gate valve plates, respectively. As well known in the art, the sliding translation of the sliding surface of a sliding gate valve plate relative to the sliding surface of the top sliding gate valve plate and, optionally, of the bottom sliding gate valve plate in a three-plate sliding gate valve, allows the control of the level of overlap between the through bores 2b of the two (or three) plates.

As explained supra, sliding gate valve plates need to be replaced within short intervals of time, due to the mechanical and thermal constraints under which they are operated. In particular, their sliding surfaces 1s can become eroded and/or their through bores 1b can become enlarged after several casting operations. In order to decide whether or not the slide gate valve plates have to be replaced, it is necessary to assess beforehand their wear condition. In the present invention, the refractory condition tool 3 can be a plate condition tool for assessing, by implementing plate condition tests, the wear condition of sliding gate valves plates while the plates are still coupled to sliding gate valve of the metallurgical vessel 1.

Figure 5:
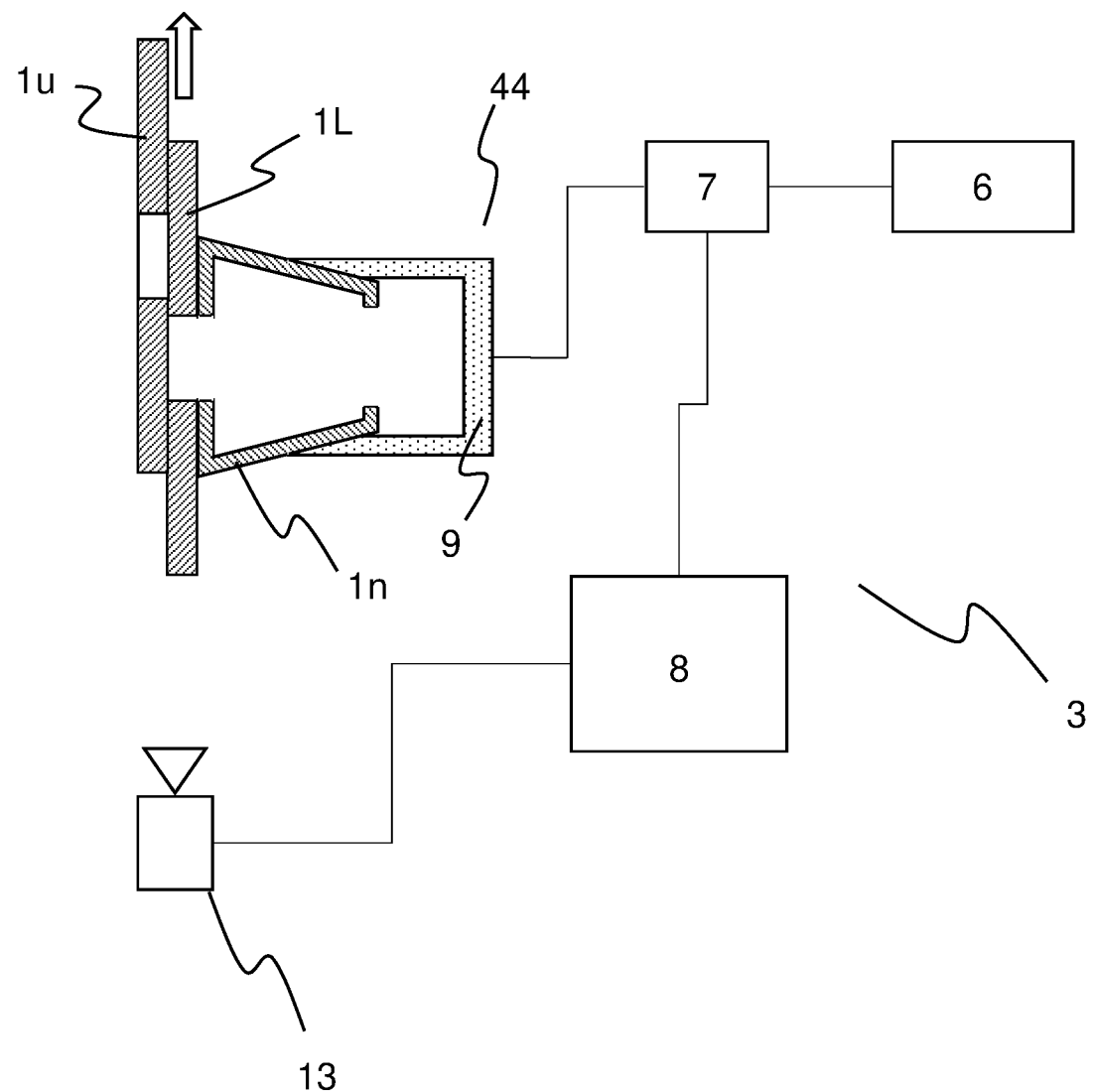
FIG. 5 is a schematic view of the main components of an example of a plate condition tool for use in a system according to the invention.
Figure 6:
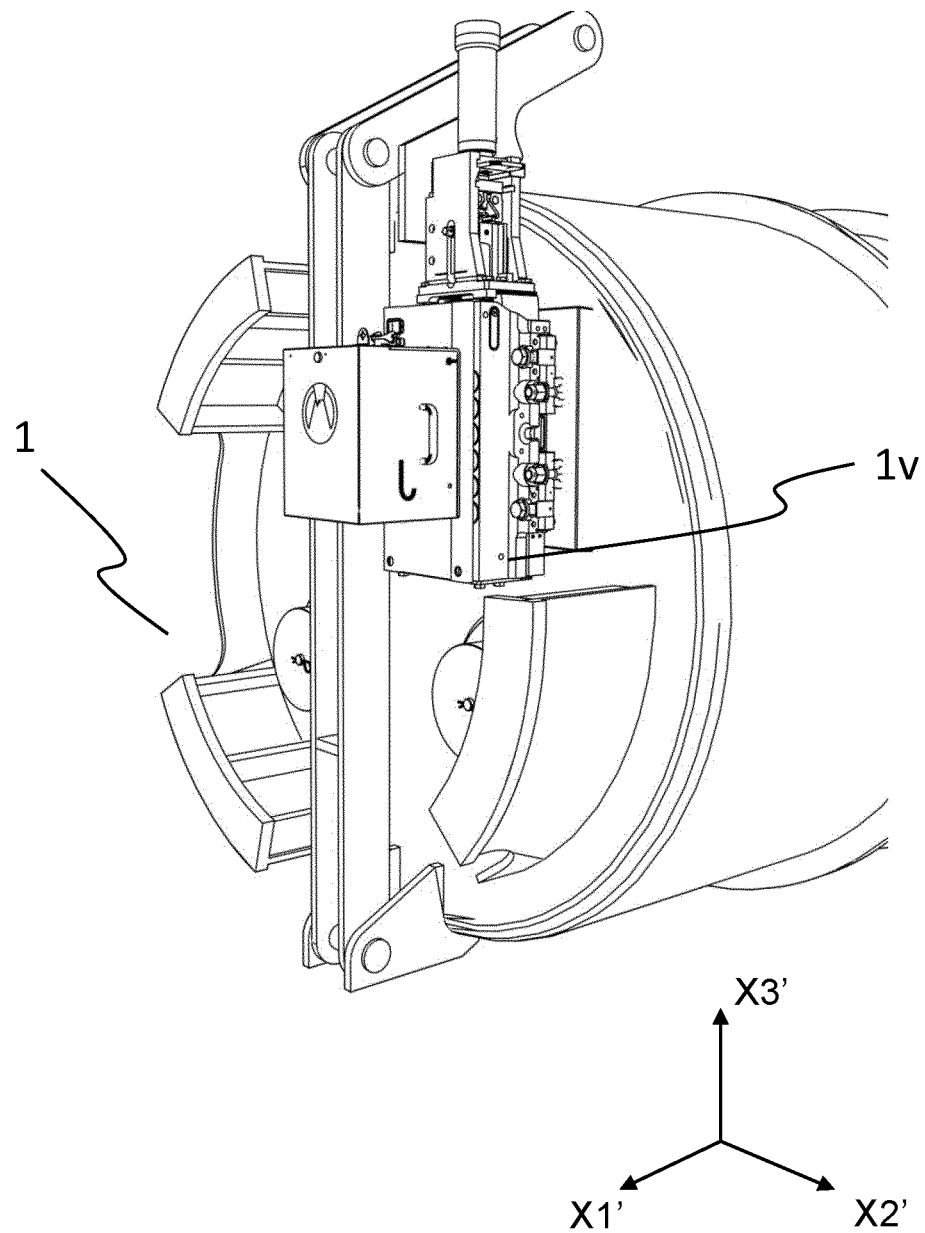
FIG. 6 shows a perspective view of the bottom of ladle comprising a slide gate valve to which is coupled a plate condition tool of a system according to the invention.

As illustrated in FIG. 5, the plate condition tool 3 according to the present invention has a main body 44 comprising a obturator 9 for obturating, at least partially, the collector nozzle 1n of a slide gate valve 1v in a metallurgical vessel 1. The function of the obturator 9 is to oppose a resistance, sometimes inaccurately called "backpressure", against the displacement of a gas trying to flow out of the collector nozzle 1n. The obturator 9 can comprise a seal holder for holding seal pressed against the collector nozzle 1n by an actuator. In another embodiment, the obturator can comprise a cap screwed on a thread of the collector nozzle 1n. In yet another embodiment, the obturator can comprise a cap chemically sealed, for example thanks to a cement, to the collector nozzle 1n. In a preferred embodiment, the obturator is configured to be a perfect airtight closure of the collector nozzle 1n. A perfect airtight closure is however not essential to the implementation of a plate condition test with the plate condition tool according to the invention. The plate condition tool 3 can indeed be used for example even with a damaged collector nozzle 1n to which the obturator 9 can no longer be sealed airtight.

One essential feature of present invention is a gas injecting device comprising a pressure regulator 6 for injecting a gas in the collector nozzle 1n through the obturator 9 at a target pressure. A pressure regulator is a control valve configured to receive a gas at an input pressure and to reduce such input pressure to a desired value, the target pressure, at its output. In the present invention, the pressure regulator 6 can for example be an electronic proportional pressure regulator configured to receive compressed air at a pressure of 6 bar from a high-pressure air supply, and to regulate the gas flow between its input and its output such to maintain a target pressure of 1.5 bar at its output. The gas injecting device is advantageously configured to inject the gas in a through hole of the obturator 9 thanks to a supply duct.

Another essential feature of the present invention is the presence of a gas flow measuring device 7, or flowmeter 7, configured to measure the flow of the gas injected by the gas injecting device in the collector nozzle 1n. As illustrated in FIG. 5, such gas flow measuring device 7 is advantageously fitted between the pressure regulator 6 and the obturator 9, such that the gas coming from the output of the pressure regulator 6 flows through the gas flow measuring device 7 before entering the collector nozzle 1n.

A third essential feature of the present invention is a controller 8 being communicatively connected to the gas flow measuring device 7 and being configured to receive input data relating to the relative position of the slide gate valve plates. Such controller is advantageously an electronic controller, such as a PLC, configured to store in a memory of said controller values of (i) the gas flow and of (ii) the relative position of the slide gate valve plates at successive timesteps. In an advantageous embodiment, the controller 8 is communicatively connected to the pressure regulator 6. The controller 8 is then a central unit which monitors the pressure regulated by the pressure regulator 6, the gas flow measured by the flowmeter 7 and the relative position of the slide gate vale plates 1u, 1L, 1m. In an advantageous embodiment, the controller 8 is further configured to control the relative sliding motion of the slide gate valve plates 1u, 1L, 1m by actuating the pneumatic or hydraulic piston 17. In this configuration, the controller 8 will be able to initiate itself the relative sliding motion of the slide gate vale plates 1u, 1L, 1m necessary to implement a full plate condition test. In an advantageous embodiment, the controller 8 is configured to implement a plate condition test while the slide gate valve 1v is moved from the closed configuration to the open configuration.

By processing the gas flow measurement data and the relative position data of the slide gate valve plates 1u, 1L, 1m, the controller 8 will be able to assess indicators relating to the wear state of the slide gate valve plates 1u, 1L, 1m. The gas flow measured by the flowmeter 7 during the relative displacement of the slide gate valve plates indeed strongly correlates with the amount of gas flowing through the slide gate valve 1v. As already explained supra, with slide gate valve plates in a perfect state (no wear), a fluid can only flow through the slide gate valve when there is at least a partial overlap between the through bores 1b of the sliding valve plates 1u, 1L, 1m. As the through bores 1b of slide gate valve plates in a perfect state have a known diameter, the profile of the gas flow has a shape with a sharp variation at a known relative position of the slide gate valve plates. Such sharp variation of the gas flow is indeed observed at the position at which the through bores 1b start or stop to, depending whether the slide gate valve 1v was initially in a closed gate (sharp increase) or in an open gate configuration (sharp decrease).

Figure 7A:
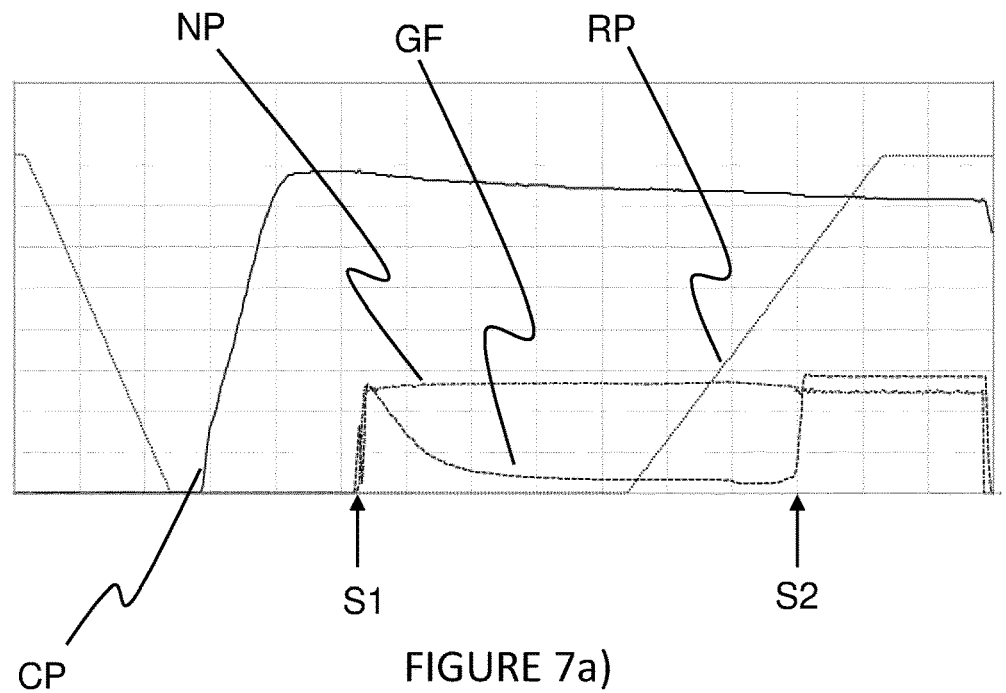
FIG. 7 shows graphs of parameters monitored by a plate condition tool of a system according to the invention; The figures are not drawn to scale.

Such sharp variation of the gas flow is illustrated in FIG. 7a) which shows the graph GF of the gas flow with respect to the time variable, when the relative position RP of the slide gate valve plates is changed from a closed gate configuration to an open configuration. The initial peak S1 corresponds to the gas flow necessary to raise the pressure in the collector nozzle in. The sharp increase S2 in the gas flow corresponds to the relative position of the slide gate valve iv at which the through bores 2b start to overlap. The graph NP shows the gas pressure monitored by the pressure regulator 6, which reaches its target value of 1.5 bar after the initial gas flow peak S1.

Figure 7B:
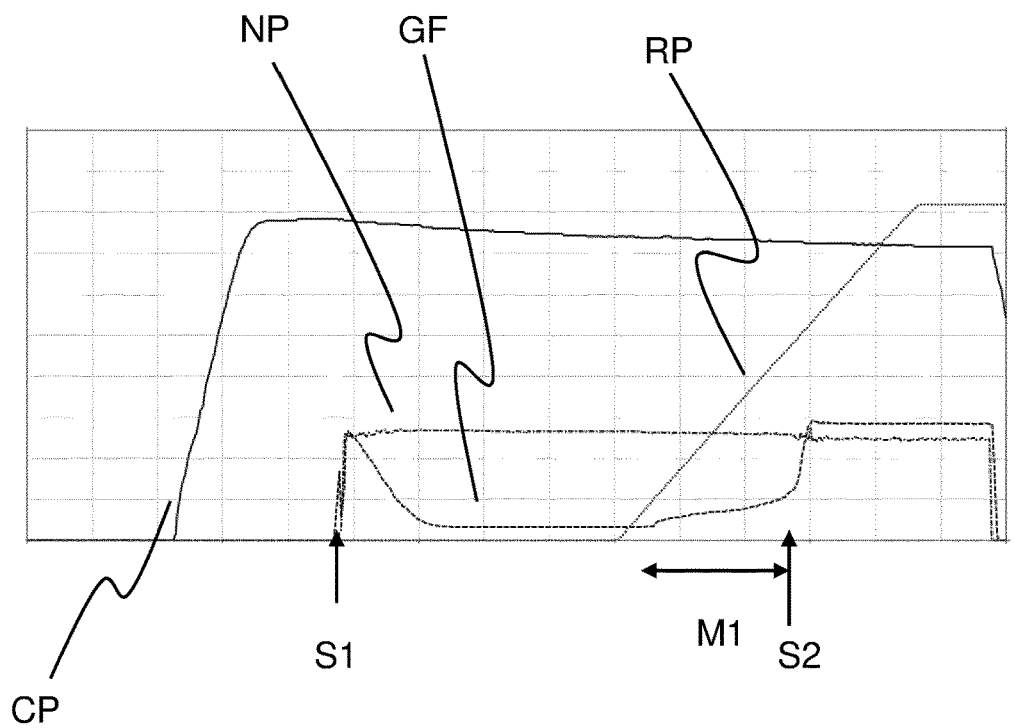

FIG. 7b) shows the same graphs as FIG. 7a) but this time for worn plates. Worn plates are characterized by eroded sliding surfaces 1s and/or enlarged through bores 1b. In the case of eroded surfaces 1s, the sharp increase S2 in the gas flow is preceded by a mild increase M1 reflecting the leakage occurring when the through bores 1b become in fluid communication before they start to overlap. A shift to the left of the sharp increase S2 can also be observed when the worn plates have enlarged through bores 1b. The plate condition tool 3 with its controller 8 will allow to detect and to quantify these alterations of the GF graph.

In one embodiment, the controller 8 can be configured to quantify the leakage due to the erosion of the sliding surfaces 1s by computing the area below the graph GF of the gas flow, or in other words the integral of the gas flow with respect to the time variable. In order to generate a meaningful physical indicator relating to the leakage due to the erosion, such integral will advantageously be put in perspective, e.g. normalized, with the sliding speed of the moving slide gate valve plate during the test. On the other hand, the enlargement of the through bores 1b of the plates can be quantified by assessing the shift of the sharp increase S2. In one embodiment, the position of the sharp increase S2 can be found by computing the derivative of the graph GF of the gas flow and by looking for local maxima of this derivative. A relative position of the slide gate valve plates 1u, 1L, 1m can then be associated to this sharp increase S2 by using the graph RP.

In order to generate the graph RP of the relative position of the slide gate valve plates 1u, 1L, 1m, and to extract the physical indicators described supra, the controller 8 must receive an electronic signal related to said relative position. In one embodiment, such electronic signal can be provided by a rangefinder configured to measure the displacement of the moving slide gate valve plate 1L, 1m. Alternatively, such electronic signal can be directly obtained from the control system of the pneumatic or hydraulic piston 17 actuating the movable carriage 11L, 11m of the slide gate valve 11. This implementation is however only advantageous if the control system can determine the position of the moving slide gate valve plate 1L, 1m with a sufficient accuracy.

The invention claimed is:

1. A system for tracking and assessing a condition of replaceable refractory elements in a metallurgic facility, comprising:
    a) a plurality of identifiable metallurgical vessels, wherein each of said identifiable metallurgical vessels comprises at least one removable refractory element;
    b) a plurality of replacement refractory elements, wherein each replacement refractory element comprises a machine-readable identification tag comprising refractory element identification data;
    c) a reading station, for reading the machine-readable identification tag of a replacement refractory element positioned in a reading zone of the reading station;
    d) a refractory condition tool for assessing the condition of refractory elements coupled to anyone of said metallurgical vessels, wherein the refractory condition tool is a plate condition tool for measurement of condition data of slide gate valve plates coupled to the slide gate valve of a metallurgic vessel, said slide gate valve comprising a collector nozzle protruding from an outer wall of said slide gate valve, said slide gate valve being able to switch between an open and a closed configuration by sliding at least two slide gate valve plates with respect to one another, said collector nozzle being in fluid communication with a casting channel of said metallurgic vessel when said slide gate valve is in the open configuration, said plate condition tool comprising:
        i) a main body comprising an obturator for obturating at least partially the collector nozzle;
        ii) a gas injecting device comprising a pressure regulator for injecting a gas in the collector nozzle through the obturator at a target pressure;
        iii) a gas flow measuring device for measuring the flow of the gas injected by the gas injecting device;
        iv) a controller communicatively connected to the gas flow measuring device and configured to receive input data relating to the relative position of the slide gate valve plates;
    e) a monitoring unit comprising at least one electronic processor and being connectable to the reading station and the refractory condition tool, wherein the monitoring unit is configured to:
        i) receive, from the refractory condition tool, condition data of at least one refractory element coupled to one of said metallurgical vessels;
        ii) receive identification data of said metallurgical vessel;
        iii) store in a refractory condition database said condition data in association with identification data of said metallurgical vessel;
        iv) decide whether the refractory element must be replaced based on said condition data ("GO OR NO GO"), and in case the case the refractory element must be replaced ("NO GO"), the monitoring unit is configured to:
            a) ascertain that refractory element identification data received from the reading station corresponds to the identification data of the replacement refractory element replacing said at least one refractory element;
            b) associate in the refractory condition database said refractory element identification data with the identification data of said metallurgical vessel.

2. The system according to claim 1, wherein the monitoring unit comprises a human-machine interface or HMI, wherein said HMI is configured to inform a human operator whether the refractory element must be replaced or not.

3. The system according to claim 2, wherein, when a refractory element must be replaced, the HMI is configured to request that a human operator acknowledges that refractory element identification data received by the reading station corresponds to the identification data of the replacement refractory element replacing said at least one refractory element.

4. The system according to claim 2, wherein each metallurgical vessel comprises a machine-readable tag, and wherein the monitoring unit is configured to read such machine-readable tag when the metallurgical vessel is in a detection zone of the monitoring unit.

5. The system according to claim 4, wherein:
i) the monitoring unit is configured to associate by default in the refractory condition database the refractory element identification data of the replacement refractory element placed in the reading zone of the reading station with the identification data of the metallurgical vessel located in the detection zone of the monitoring unit;
ii) the HMI is configured such that a human operator can modify the default association.

6. The system according to claim 1, wherein the monitoring unit operates a robotic system configured to perform one or more of the following manipulations: manipulating the replacement refractory elements, placing a replacement refractory element in the reading zone of the reading station, removing a spent refractory element from the metallurgical vessel, coupling a replacement refractory element to the metallurgical vessel, coupling and uncoupling the refractory condition tool to the metallurgical vessel.

7. The system according to claim 1, wherein the reading station is an RFID workbench and wherein replacement refractory elements comprise RFID tags.

8. The system according to claim 1, wherein the identification data of the metallurgical vessels are included on 2D barcodes placed on the ladle gates, said monitoring unit configured to read such 2D barcodes.

9. System according to claim 1, wherein the monitoring unit is configured to store, in said refractory condition database, refractory manufacturing data in association with said refractory identification data, said refractory manufacturing data comprising at least one of the following data:
a) Refractory material;
b) Refractory manufacturing process parameter;
c) Refractory manufacturing date.

10. The system according to claim 1, wherein the monitoring unit is configured to store, in said refractory condition database, metal production data in association with the identification data of said metallurgical vessel, said metal production data comprising at least one of the following data:
a) Type of the metal cast in said metallurgical vessel;
b) Type of different refractories used in the metallurgical vessel;
c) Frequency and/or duration of down time(s) of the metallurgical vessel;
d) End product features of a metal production process;
e) Casting times;
f) Casting temperatures;
g) Heat chemistry;
h) Install date/time of new refractory element(s);
i) Number of casts with the same refractory element(s).

11. The system according to claim 10, further comprising a computing unit, said computing unit configured to train a machine learning predictive model for the refractory condition data, wherein said computing unit is further configured to:
i) generate a plurality of training instances based on the data of said refractory condition database, wherein each training instance comprises:
a training instance input based on one or more of: at least one parameter extracted from the refractory manufacturing data, and at least one parameter extracted from the metal production data;
a training instance output based at least one parameter extracted from the refractory condition data;
ii) train the machine learning predictive model based on the training instances.

12. The system according to claim 1, wherein the controller is configured to store, in a memory of said controller, the gas flow (GF) necessary to reach the target pressure and the relative position (RP) of the slide gate valve plates as functions of a time variable.

13. The system according to claim 1, wherein the controller is configured to process the gas flow (GF) function to extract a first indicator by computing a derivative of said function and a second indicator by computing an integral of said function.

14. A method implemented by the at least one processor of the monitoring unit in a system according to claim 1, the method comprising the steps of:
i) receiving, from the refractory condition tool, condition data of a refractory element coupled to an identifiable metallurgical vessel;
ii) receiving identification data of the metallurgical vessel;
iii) storing in a refractory condition database said condition data in association with identification data of said metallurgical vessel;
iv) deciding whether the refractory element must be replaced based on said condition data ("GO OR NO GO"), and in case the case the refractory element must be replaced ("NO GO"), the monitoring unit is configured to implement the steps of:
a) ascertaining that refractory element identification data received from a reading station correspond to the identification data of the replacement refractory element replacing said at least one refractory element;
b) associating in the refractory condition database said refractory element identification data with the identification data of said metallurgical vessel.

15. The system of claim 1 wherein each of the at least one removable refractory element is a slide gate valve plate.

16. The system of claim 1 wherein the refractory manufacturing process parameter is at least one of temperature, pressure, or duration of various manufacturing steps.

* * * * *